(12) United States Patent
Tsuda et al.

(10) Patent No.: US 10,983,399 B2
(45) Date of Patent: Apr. 20, 2021

(54) METHOD FOR MANUFACTURING LIQUID CRYSTAL DISPLAY DEVICE AND LIQUID CRYSTAL DISPLAY DEVICE

(71) Applicant: Panasonic Liquid Crystal Display Co., Ltd., Himeji (JP)

(72) Inventors: Kazuhiko Tsuda, Hyogo (JP); Yoshiki Watanabe, Hyogo (JP); Norimichi Shirai, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 16/566,456

(22) Filed: Sep. 10, 2019

(65) Prior Publication Data

US 2020/0089030 A1    Mar. 19, 2020

(30) Foreign Application Priority Data

Sep. 14, 2018 (JP) .............................. JP2018-172594

(51) Int. Cl.
*G02F 1/1333* (2006.01)
*G02F 1/1339* (2006.01)

(52) U.S. Cl.
CPC ...... *G02F 1/1339* (2013.01); *G02F 1/133305* (2013.01); *G02F 1/133351* (2013.01)

(58) Field of Classification Search
CPC ............ H01L 21/02675; G02F 1/1339; G02F 1/133305; G02F 1/133351; G02F 1/1333; G02F 1/1303
See application file for complete search history.

(56) References Cited

FOREIGN PATENT DOCUMENTS

JP    2010-126398    6/2010

*Primary Examiner* — Thoi V Duong
(74) *Attorney, Agent, or Firm* — Hamre, Schumann, Mueller & Larson, P.C.

(57) ABSTRACT

A method for manufacturing a liquid crystal display device including a display panel provided with a first substrate, a second substrate, and liquid crystal, the method comprises: a first irradiation step of irradiating first positions of a first glass plate and a second glass plate with a laser beam having first irradiation energy; a second irradiation step of irradiating second positions of the first glass plate and the second glass plate with the laser beam having second irradiation energy higher than the first irradiation energy; and an etching step of exposing the display panel to an etching solution after the first irradiation step and the second irradiation step, such that the first positions are not cleaved, the second positions are cleaved, and at least a part of an outer periphery of each of the first substrate and the second substrate is formed.

10 Claims, 11 Drawing Sheets

METHOD FOR MANUFACTURING LIQUID CRYSTAL DISPLAY DEVICE AND LIQUID CRYSTAL DISPLAY DEVICE

CROSS-REFERENCE TO RELATED APPLICATION

This application claims priority from Japanese application JP 2018-172594, filed Sep. 14, 2018. This Japanese application is incorporated herein by reference.

BACKGROUND

1. Technical Field

The present disclosure relates to a method for manufacturing a liquid crystal display device and a liquid crystal display device manufactured by the method.

2. Description of the Related Art

A liquid crystal display device in which a display panel including liquid crystal is used can display an image with low power consumption, so that the liquid crystal display device is used as a display device such as a television and a monitor. In order to manufacture the display panel having any size, processing such as cutting a glass substrate of the display panel is performed (see, for example, Unexamined Japanese Patent Publication No. 2010-126398).

Unexamined Japanese Patent Publication No. 2010-126398 discloses a method for manufacturing a display panel in which a portion to be cut of the substrate is irradiated with a laser beam, and the substrate irradiated with the laser beam is etched, thereby cutting the substrate.

SUMMARY

However, in the case that the substrate is cut using the etching while a plurality of substrates including components such as liquid crystal and electronic circuits are stacked, the components are exposed to an etching solution, which results in a problem of component failure.

The present disclosure has been made to solve the problem, and provides a method for manufacturing a liquid crystal display device that can suppress generation of the component failure due to the etching.

Solution to Problem

To solve the above problem, a method for manufacturing a liquid crystal display device including a display panel provided with a first substrate, a second substrate disposed opposite to the first substrate, and liquid crystal sandwiched between the first substrate and the second substrate according to a present disclosure, the method comprises:

a first irradiation step of irradiating first positions of a first glass plate and a second glass plate with a laser beam having first irradiation energy;

a second irradiation step of irradiating second positions of the first glass plate and the second glass plate with the laser beam having second irradiation energy higher than the first irradiation energy; and an etching step of exposing the display panel to an etching solution after the first irradiation step and the second irradiation step, such that the first positions are not cleaved, the second positions are cleaved, and at least a part of an outer periphery of each of the first substrate and the second substrate is formed.

Another method for manufacturing a liquid crystal display device including a display panel provided with a first substrate, a second substrate disposed opposite to the first substrate, and liquid crystal sandwiched between the first substrate and the second substrate according to the present disclosure, the method comprises: a cutting step of cutting a first glass plate and a second glass plate by scribing; a first irradiation step of irradiating first positions of the first glass plate and the second glass plate with a laser beam; and an etching step of exposing the first glass plate and the second glass plate to an etching solution and etching at least a part of an outer periphery of each of the first substrate and the second substrate after the cutting step and the first irradiation step such that the first positions are not cleaved.

A liquid crystal display device according to the present disclosure comprises: a display panel including a first substrate, a second substrate disposed opposite to the first substrate, and liquid crystal sandwiched between the first substrate and the second substrate; and a seal member formed between the first substrate and the second substrate to bond both the first substrate and the second substrate, wherein when the display panel is viewed in planar view, the seal member includes: a first seal part annularly surrounding the liquid crystal; and a second seal part in which one end is connected to the first seal part while the other end overlaps the first substrate and the second substrate in planar view.

A method for manufacturing a liquid crystal display device according to the present disclosure can suppress generation of the component failure due to the etching.

DETAILED DESCRIPTION

Figure 1:
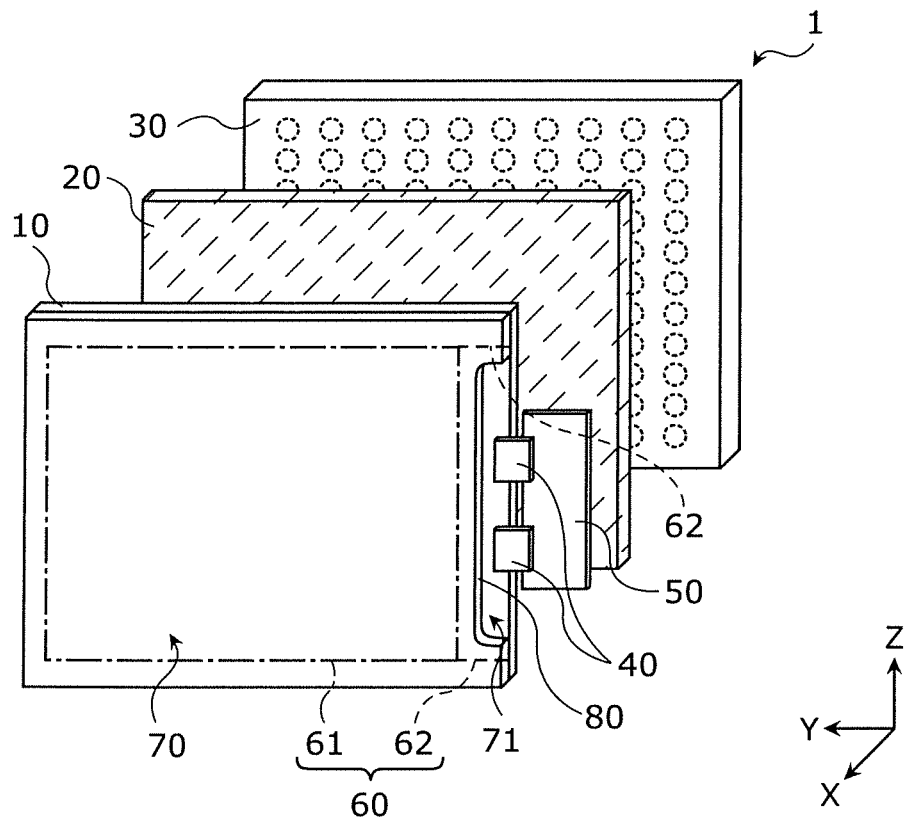
FIG. 1 is a view illustrating a schematic configuration of liquid crystal display device according to the exemplary embodiment.

Hereinafter, exemplary embodiments of the present disclosure will be described. The following exemplary embodiments illustrate a preferable specific example of the present disclosure. Thus, numerical values, shapes, materials, constituent elements, arrangement positions and connection forms of the constituent components, and the like illustrated in the following exemplary embodiments are merely examples, and are not intended to limit the present disclosure. Among the constituent elements in the following exemplary embodiments, the constituent elements not described in independent claims indicating the broadest concept of the present disclosure are described as optional constituent elements.

The drawings are schematic diagrams, and not necessarily strictly illustrated. Thus, a scale and the like do not necessarily match in the drawings. In the drawings, substantially the same configuration is designated by the same reference numerals, and overlapping description will be omitted or simplified. In the specification, the term "substantially" means inclusion of manufacturing errors and dimensional tolerances.

In each drawing, an X-axis, a Y-axis, and a Z-axis represent three axes of a three-dimensional orthogonal coordinate system. The X-axis and the Y-axis are axes orthogonal to each other, and are orthogonal to the Z-axis. In the specification, the term "thickness direction" means a thickness direction of a first glass plate or a second glass plate, and means a direction perpendicular to main surfaces of the first glass plate and the second glass plate. In the specification, the term "planar view" means one that is viewed from a direction perpendicular to the main surface of a first substrate or a second substrate. In the following exemplary embodiments, the term "planar view" means one in which a YZ-plane is viewed from an X-axis direction. In the specification, the term "side view" means one that is viewed from a direction parallel to the main surface of the first substrate or the second substrate. In the following exemplary embodiments, the term "side view" means one in which an XY-plane is viewed from a Z-axis direction.

EXEMPLARY EMBODIMENT

[Configuration of Liquid Crystal Display Device]

Figure 2:
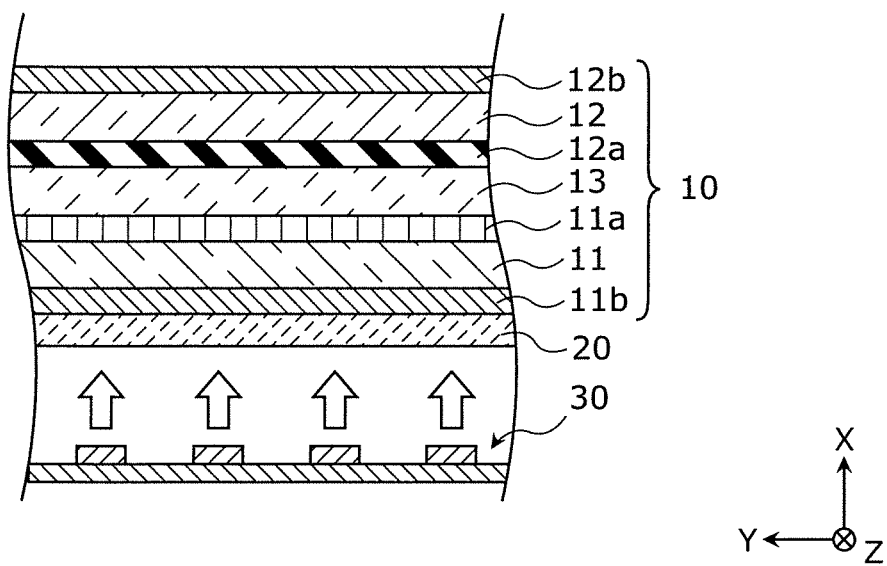
FIG. 2 is a view schematically illustrating a sectional configuration of liquid crystal display device according to the exemplary embodiment.
Figure 3A:
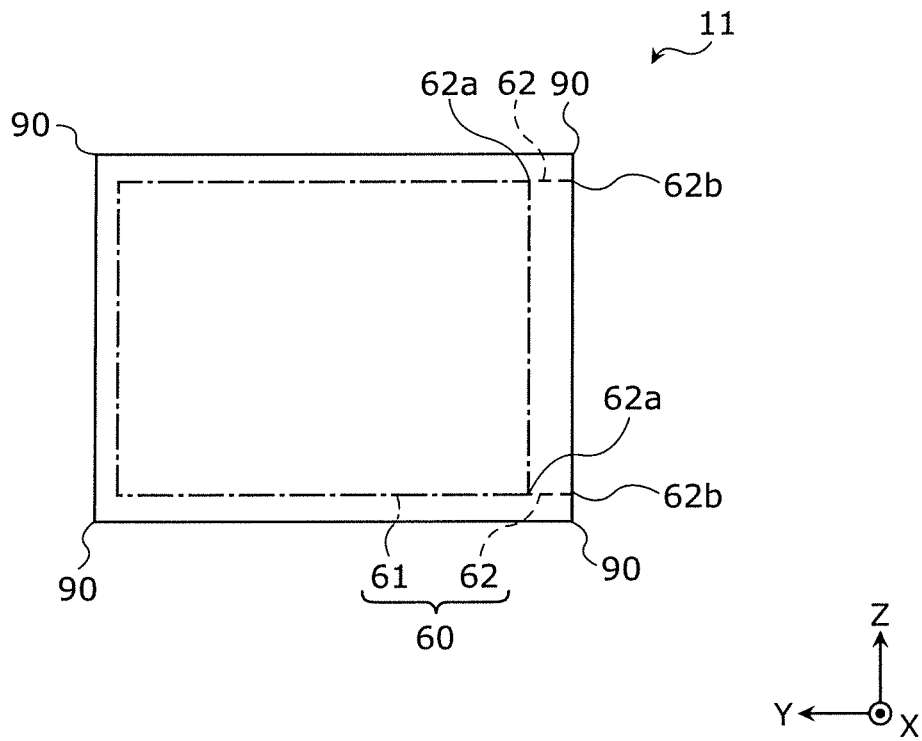
FIG. 3A is a plan view illustrating first substrate included in liquid crystal display device according to the exemplary embodiment.
Figure 3B:
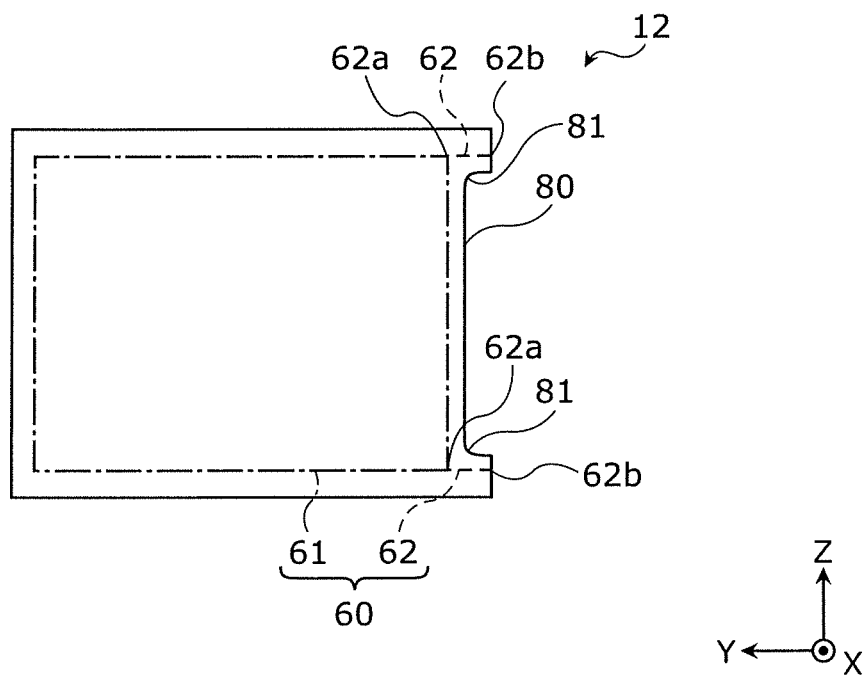
FIG. 3B is a plan view illustrating second substrate included in liquid crystal display device according to the exemplary embodiment.

A configuration of liquid crystal display device 1 according to an exemplary embodiment will be described below with reference to FIGS. 1 to 3B. FIG. 1 is a view illustrating a schematic configuration of liquid crystal display device 1 of the exemplary embodiment. FIG. 2 is a view schematically illustrating a sectional configuration of liquid crystal display device 1. Arrows in FIG. 2 schematically indicate light emitted from backlight 30. FIG. 3A is a plan view illustrating first substrate 11 included in liquid crystal display device 1 of the exemplary embodiment. FIG. 3B is a plan view illustrating second substrate 12 included in liquid crystal display device 1 of the exemplary embodiment. Seal member 60 is formed between first substrate 11 and second substrate 12, and schematically illustrated in FIGS. 1 to 3B for the sake of description. In FIGS. 1 to 3B, first seal part 61 of seal member 60 is indicated by an alternate long and short dash line, and second seal part 62 of seal member 60 is indicated by a broken line.

Liquid crystal display device 1 of the exemplary embodiment in FIGS. 1 and 2 is an example of an image display device that displays a still image or a moving image (video). Liquid crystal display device 1 includes display panel 10, diffusion sheet 20, backlight 30, flexible substrate 40, external substrate 50, and seal member 60. In liquid crystal display device 1, display panel 10, diffusion sheet 20, and backlight 30 are disposed in this order. Although not illustrated, display panel 10 and diffusion sheet 20 are bonded together, and held together with backlight 30 by a metal or resin holding member (a casing, a frame, or a chassis).

Display panel 10 displays the image visually recognized by a user. Display panel 10 has a plurality of pixels arranged in a matrix as an image display region in which the image is displayed. Examples of driving systems of display panel 10 include a lateral electric field system such as an in-plane switching (IPS) system. However, the driving system is not limited to the lateral electric field system, and may be a vertical alignment (VA) system or a twisted nematic (TN) system. Display panel 10 has a substantially rectangular flat plate shape in planar view. Display panel 10 includes first substrate 11, second substrate 12 disposed opposite to first substrate 11, and liquid crystal layer (liquid crystal) 13 sandwiched between first substrate 11 and second substrate 12.

First substrate 11 has translucency in which light emitted from backlight 30 is transmitted. Specifically, first substrate 11 is a glass plate, and has a substantially rectangular shape in planar view. First substrate 11 includes a thin film transistor (TFT) layer 11a on the main surface on the side of liquid crystal layer 13.

TFT layer 11a is a layer in which a TFT, a wiring, and the like are provided. A pixel electrode used to apply voltage to liquid crystal layer 13 is formed in TFT layer 11a.

Polarizing plate 11b is disposed on the surface of the first substrate 11 on the opposite side to the surface on which TFT layer 11a is disposed.

Second substrate 12 has translucency in which light emitted from backlight 30 is transmitted. Specifically, second substrate 12 is a glass plate, and includes color filter (CF) layer 12a on the main surface on the side of liquid crystal layer 13.

For example, CF layer 12a is a layer including a color filter constructed with a red color filter, a green color filter, and a blue color filter.

Polarizing plate 12b is disposed on the surface of second substrate 12 on the opposite side to the surface on which CF layer 12a is disposed.

Notch 80 is formed in second substrate 12. Specifically, when display panel 10 is viewed in planar view, second substrate 12 includes notch 80 in which one side where end 62b of second seal part 62 of seal member 60 (to be described later) overlaps in planar view is cut out. More specifically, notch 80 is formed such that one side of second substrate 12 formed in the rectangular shape in planar view is recessed toward a central portion of second substrate 12 in planar view. In the exemplary embodiment, notch 80 is formed on one side located in a negative Y-axis direction side. Notch 80 is not formed in first substrate 11. That is, notch 80 is formed only in second substrate 12 in first substrate 11 and second substrate 12. When first substrate 11 and second substrate 12 overlap each other, a part of the surface of first substrate 11 on which TFT layer 11a is formed is exposed by forming notch 80 in second substrate 12. Consequently, the wiring and the like formed on the surface on the side of liquid crystal layer 13 of first substrate 11 and external substrate 50 can easily electrically be connected to each other by utilizing non-overlapping portion 71 that is an exposed portion. Notch 80 may be formed on any side of second substrate 12, or a plurality of notches 80 may be formed.

A contour of notch 80 of second substrate 12 has a radius of curvature larger than that of four corners 90 of first substrate 11 in planar view. Specifically, two corners 81 of notch 80 have radii of curvature larger than those of four corners 90 of first substrate 11 in planar view.

Polarizing plates 11b, 12b are a sheet-shaped polarizing film made of a resin material, and are disposed so as to sandwich first substrate 11 and second substrate 12. Polarizing plate 11b and polarizing plate 12b are disposed such that the polarization directions of polarizing plate lib and polarizing plate 12b are orthogonal to each other. That is, polarizing plate 11b and polarizing plate 12b are disposed in a cross-nicol state.

Liquid crystal layer 13 is a layer including the liquid crystal sealed between first substrate 11 and second substrate 12. Liquid crystal layer 13 is surrounded by first seal part 61 of seal member 60 in planar view. The material of liquid crystal layer 13 may appropriately be selected according to the driving system.

Diffusion sheet 20 is an optical member disposed between display panel 10 and backlight 30. Diffusion sheet 20 functions as a light diffusion layer that diffuses (scatters) incident light. Thus, the light, which is emitted from backlight 30 and enters diffusion sheet 20, is diffused by diffusion sheet 20, transmitted through diffusion sheet 20, and enters display panel 10. For example, diffusion sheet 20 is a resin sheet in which reflective fine particles are dispersed in a resin material. However, the present disclosure is not limited to the resin sheet in which the reflective fine particles are dispersed in the resin material, but may be a resin sheet in which the light is diffused by a micro uneven structure or the like.

Backlight 30 emits the light toward display panel 10. Backlight 30 is a surface light source that uniformly emits scattered light (diffused light). For example, backlight 30 is a light emitting diode (LED) backlight in which the LED is used as a light source. However, backlight 30 is not limited to the LED backlight. In the exemplary embodiment, backlight 30 is a direct under type. Alternatively, backlight 30 may be an edge type.

Flexible substrate 40 is a substrate connecting external substrate 50 and first substrate 11. Specifically, flexible substrate 40 electrically connects electronic components included in TFT layer 11a disposed on first substrate 11 and external substrate 50.

External substrate 50 is a substrate in which a circuit that receives an external video signal from an outside of liquid crystal display device 1 is formed. Specifically, external substrate 50 is a drive substrate that controls the video displayed by liquid crystal display device 1 by electrically controlling each electronic component included in TFT layer 11a.

Display panel 10 includes overlapping portion 70 in which first substrate 11 and second substrate 12 overlap each other in planar view and non-overlapping portion 71 in which first substrate 11 and second substrate 12 do not overlap each other in planar view. First substrate 11 is connected to flexible substrate 40 in non-overlapping portion 71 in which first substrate 11 does not overlap second substrate 12 in planar view. More specifically, TFT layer 11a formed on first substrate 11 and flexible substrate 40 are electrically connected to each other in non-overlapping portion 71.

Seal member 60 is an adhesive formed between first substrate 11 and second substrate 12, and bonded to both first substrate 11 and second substrate 12. For example, seal member 60 is a resin material. Liquid crystal layer 13 is surrounded and sealed by first substrate 11, second substrate 12, and seal member 60. Specifically, liquid crystal layer 13 is surrounded by seal member 60 in planar view. More specifically, seal member 60, when display panel 10 is viewed in planar view, includes first seal part 61 annularly surrounding liquid crystal layer 13 and second seal part 62 in which end 62a is connected to first seal part 61 while end 62b overlaps first substrate 11 and second substrate 12 in planar view.

For example, first seal part 61 is formed so as to have a rectangular ring shape in planar view, and formed between first substrate 11 and second substrate 12 so as to surround liquid crystal layer 13 in planar view. That is, first seal part 61 bonds first substrate 11 and second substrate 12 together, and also functions as a sealing member of liquid crystal layer 13.

Second seal part 62 bonds first substrate 11 and second substrate 12 outside the annular-shaped portion of first seal part 61 between first substrate 11 and second substrate 12. Second seal part 62 is linearly formed in planar view. In the exemplary embodiment, two second seal parts 62 are formed at positions where ends 62a are in contact with the corners of rectangular annular first seal part 61. Two second seal parts 62 extend linearly from two parallel sides of first seal part 61 to end edges of first substrate 11 and second substrate 12. Notch 80 is located between two linearly extending portions constituting second seal part 62.

[Method for Manufacturing Liquid Crystal Display Device]

A method for manufacturing liquid crystal display device 1 of the exemplary embodiment will be described below with reference to FIGS. 4 to 11.

First Example

Figure 4:
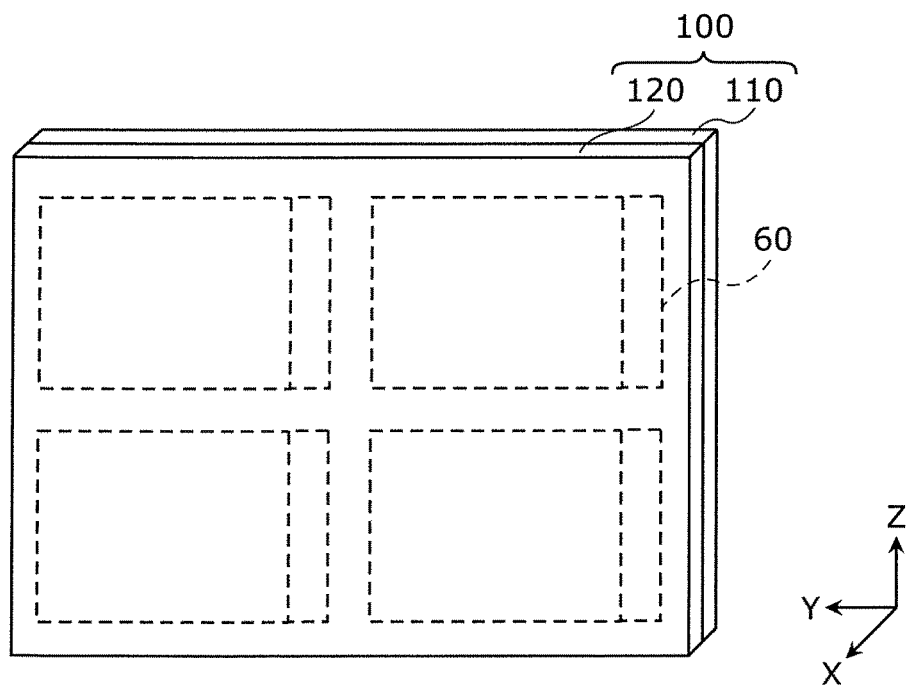
FIG. 4 is a view schematically illustrating first glass plate and second glass plate before first substrate and second substrate provided in liquid crystal display device of the exemplary embodiment are formed.

FIG. 4 is a view schematically illustrating first glass plate 110 and second glass plate 120 before first substrate 11 and second substrate 12 provided in liquid crystal display device 1 of the exemplary embodiment are formed.

In manufacturing display panel 10, plate body 100 in which first glass plate 110 and second glass plate 120 are stacked is prepared.

In first glass plate 110, TFT layer 11a in FIG. 2 is formed on the surface opposed to second glass plate 120. In second glass plate 120, CF layer 12a in FIG. 2 is formed on the surface opposed to first glass plate 110. Display panel 10 is formed by cutting plate body 100.

Seal member 60 is disposed between first glass plate 110 and second glass plate 120 according to the number of display panels 10 formed by cutting plate body 100. In FIG. 4, the position where seal member 60 is disposed is schematically illustrated by a broken line.

Although FIG. 4 illustrates plate body 100 on which four display panels 10 are formed, the number of display panels 10 formed by cutting plate body 100 is not particularly limited.

Figure 5:
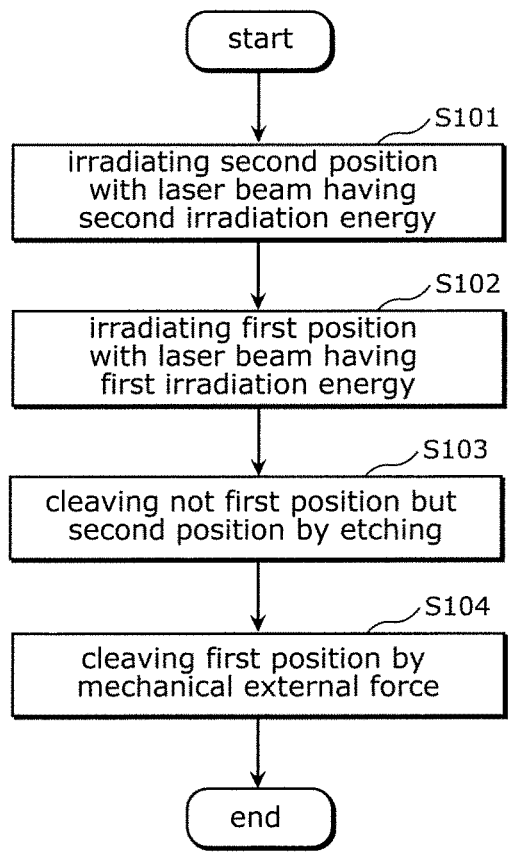
FIG. 5 is a flowchart illustrating the method for manufacturing liquid crystal display device according to the exemplary embodiment.
Figure 6:
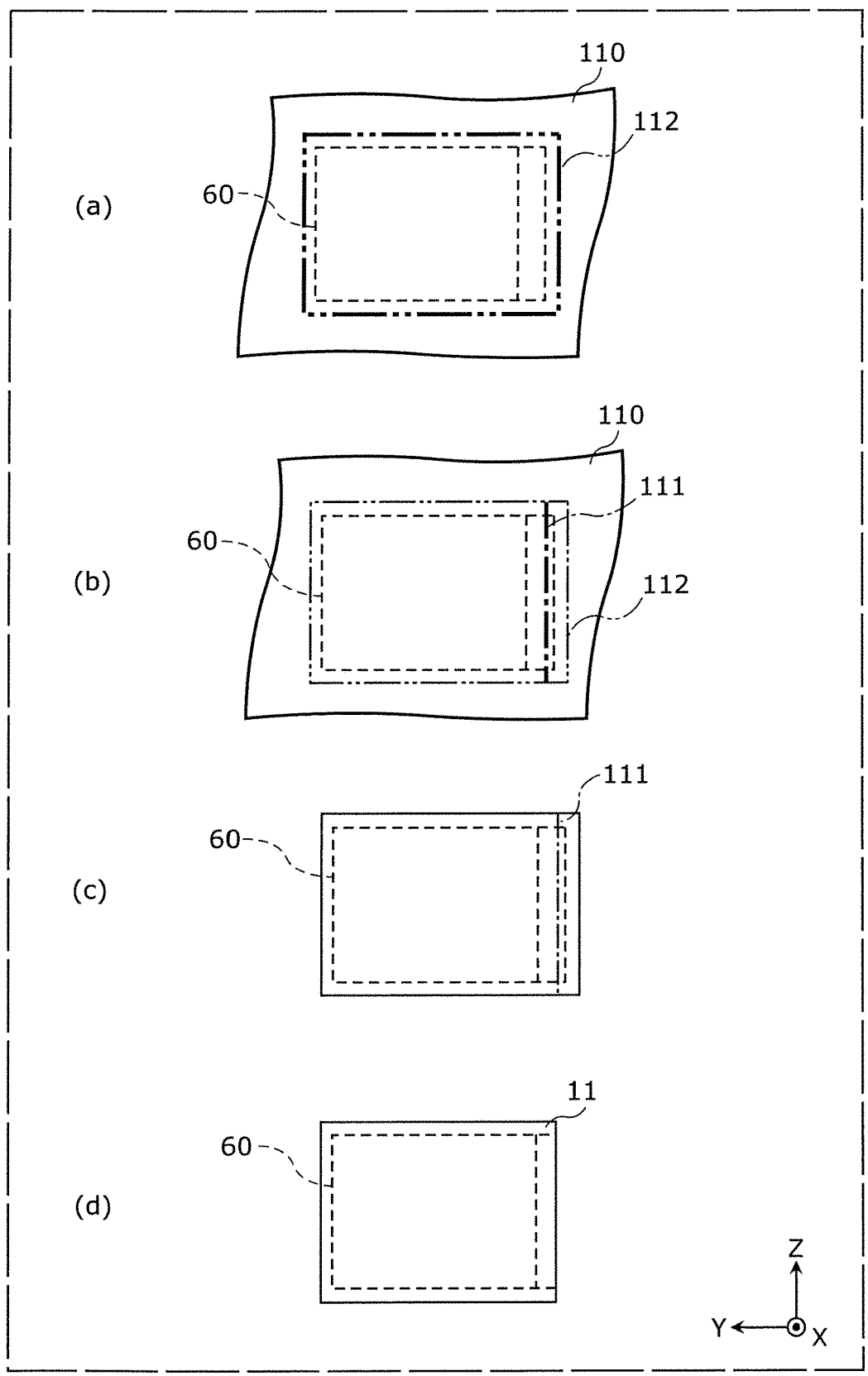
FIG. 6 is a plan view illustrating a process of manufacturing first substrate included in liquid crystal display device according to the exemplary embodiment.
Figure 7:
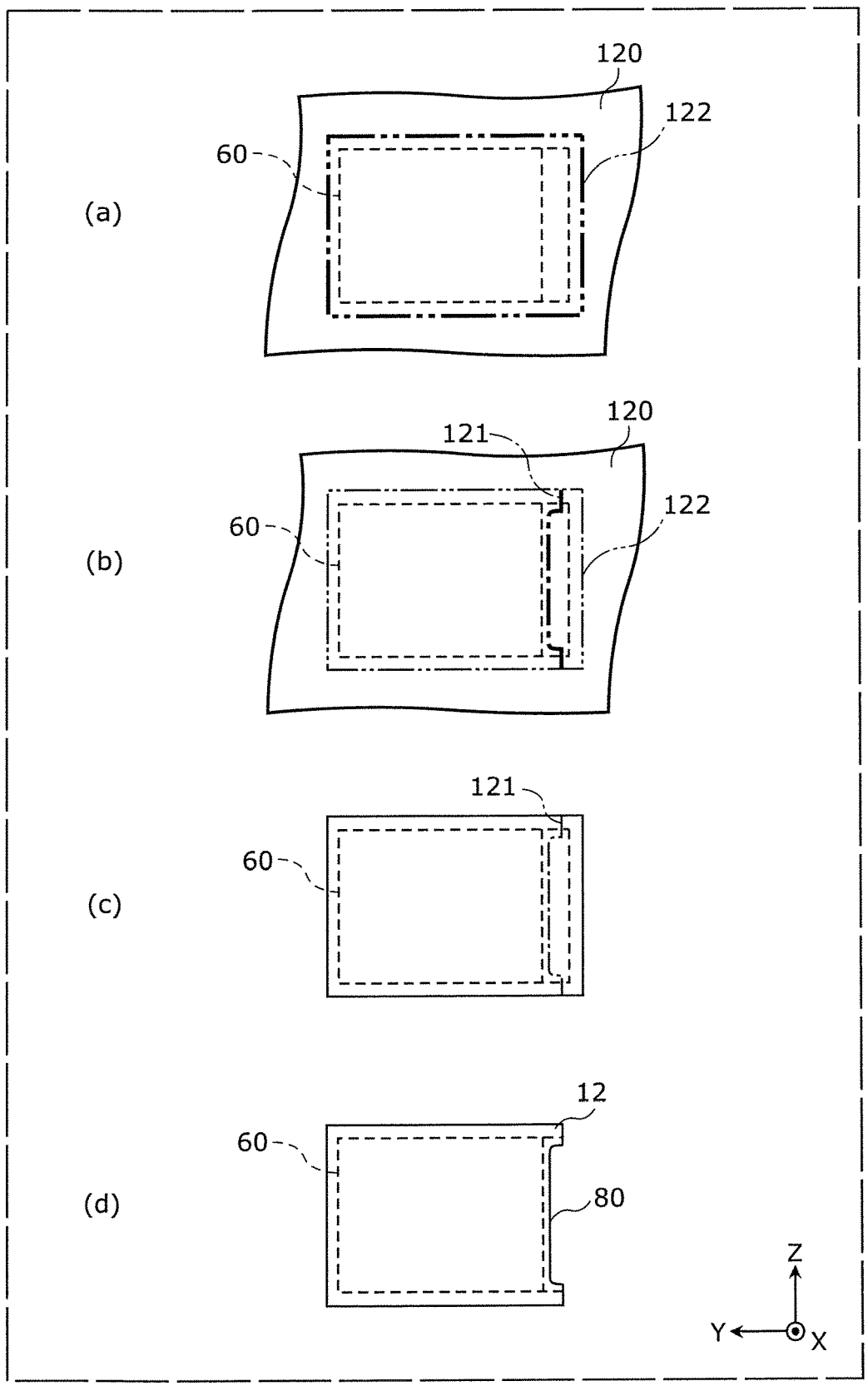
FIG. 7 is a plan view illustrating a process of manufacturing second substrate included in liquid crystal display device according to the exemplary embodiment.
Figure 8:
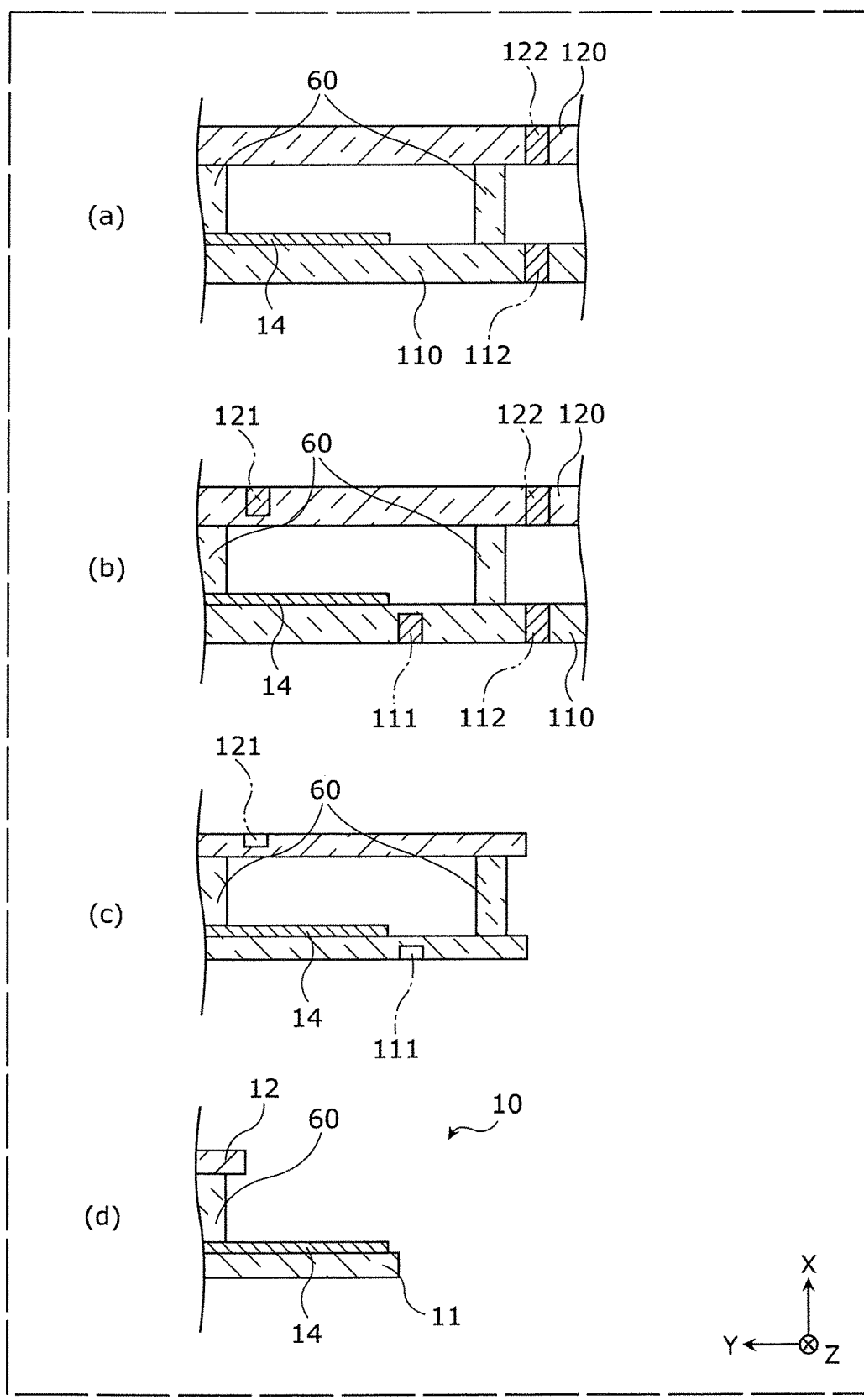
FIG. 8 is a sectional view illustrating a process of manufacturing display panel included in liquid crystal display device according to the exemplary embodiment.

FIG. 5 is a flowchart illustrating the method for manufacturing liquid crystal display device 1 of the exemplary embodiment. FIG. 6 is a plan view illustrating a process of manufacturing first substrate 11 included in liquid crystal display device 1 of the exemplary embodiment. FIG. 7 is a plan view illustrating a process of manufacturing second substrate 12 included in liquid crystal display device 1 of the exemplary embodiment. FIG. 8 is a sectional view illustrating a process of manufacturing display panel 10 included in liquid crystal display device 1 of the exemplary embodiment.

In FIG. 6, only first glass plate 110 is illustrated in first glass plate 110 and second glass plate 120 for the sake of the description. In FIG. 7, only second glass plate 120 is illustrated in first glass plate 110 and second glass plate 120 for the sake of the description. Seal members 60 in FIGS. 6 and 7 are formed at overlapping positions in planar view. In FIGS. 6 and 7, the position where seal member 60 is disposed is schematically illustrated by the broken line. FIGS. 6 and 7 are an enlarged view illustrating a portion in which one display panel 10 is formed in plate body 100 in FIG. 5. FIG. 8 schematically illustrates a part of a section of a central portion in a direction parallel to the Z-axis direction of display panel 10 in the portion in which one display panel 10 is formed.

Electrode layer 14 in FIG. 8 is a metal wiring that is disposed in the surface of TFT layer 11a of first substrate 11 and electrically connected to TFT layer 11a. Electrode layer 14 is electrically connected to flexible substrate 40 in FIG. 1, thereby electrically connecting external substrate 50 electrically connected to flexible substrate 40 and TFT layer 11a.

A second irradiation step of irradiating second position 112 of first glass plate 110 illustrated in a part (a) of FIG. 6 and a part (a) of FIG. 8 and second position 122 of second glass plate 120 illustrated in a part (a) of FIG. 7 and a part (a) of FIG. 8 with laser beam 210 having second irradiation energy is performed (step S101). In FIGS. 6 and 7, second positions 112, 122 are indicated by alternate long and two short dashes lines. Consequently, a modified layer in which first glass plate 110 or second glass plate 120 is modified is formed at second position 112 of first glass plate 110 and second position 122 of second glass plate 120. In the modified layer, an etching speed is enhanced due to etching (to be described later). For example, the modified layer is uniformly formed in the thickness direction at second position 112 of first glass plate 110 and second position 122 of second glass plate 120 by irradiating first glass plate 110 and second glass plate 120 with laser beam 210 having the second irradiation energy.

A first irradiation step of irradiating first position 111 of first glass plate 110 illustrated in a part (b) of FIG. 6 and a part (b) of FIG. 8 and first position 121 of second glass plate 120 illustrated in a part (b) of FIG. 7 and a part (b) of FIG. 8 with laser beam 210 having first irradiation energy is performed (step S102). In FIGS. 6 and 7, first positions 111, 121 are indicated by alternate long and short dash lines. Consequently, the modified layer in which first glass plate 110 or second glass plate 120 is modified is formed at a part of first position 111 of first glass plate 110 and first position 121 of second glass plate 120. Specifically, for example, by irradiating first glass plate 110 and second glass plate 120 with laser beam 210 having the first irradiation energy, the modified layer is formed in a part of the thickness direction at first position 111 of first glass plate 110 and first position 121 of second glass plate 120, but the modified layer is not formed the other portion except for the part.

A part of first position 111 of first glass plate 110 overlaps first position 121 of second glass plate 120 in planar view. The other portion of first position 111 of first glass plate 110 does not overlap first position 121 of second glass plate 120 in planar view. A whole of second positions 112 of first glass plate 110 overlaps second position 122 of second glass plate 120 in planar view.

First positions 111, 121 fall within a range of a region surrounded by second positions 112, 122. Specifically, first position 111 of first glass plate 110 falls within the range of the region surrounded by second position 112 of first glass plate 110 in planar view. First position 121 of second glass plate 120 falls within the range of the region surrounded by second position 122 of second glass plate 120 in planar view.

The irradiation energy (specifically, the first irradiation energy and the second irradiation energy) is a value defined by an irradiation time of the laser beam per unit area, irradiation power of the laser beam, and an irradiation area of an object (specifically, first glass plate 110 or second glass plate 120) with the laser beam of the object irradiated with the laser beam. The second irradiation energy that is a total light quantity of the laser beam with which unit areas of second positions 112, 122 are irradiated is set to a value higher than that of the first irradiation energy that is a total light quantity of the laser beam with which unit areas of first positions 111, 121 are irradiated. For example, the laser beam is a femtosecond laser beam (wavelength of 1052 nm, pulse width of 500 fs, average power of 15 W, pulse energy of 100 μJ). The laser beam is focused using a lens. The laser beam is applied to second position 112, 122 for a total of 3 seconds per 1 cm$^2$, and is applied to first positions 111, 121 for a total of 2 seconds per 1 cm$^2$.

The second irradiation energy may be set to a value higher than that of the first irradiation energy, and the irradiation time and the irradiation power of the laser beam may arbitrarily be set. For example, the irradiation time of the laser beam per unit length of each of second positions 112, 122 in step S101 is longer than the irradiation time of the laser beam per unit length of each of first positions 111, 121 in step S102. Consequently, the second irradiation energy may be set to a value higher than that of the first irradiation energy. Alternatively, the number of laser beam irradiation times at each of second positions 112, 122 in step S101 is larger than the number of laser beam irradiation times at each of first positions 111, 121 in step S102. Consequently, the second irradiation energy may be set to a value higher than that of the first irradiation energy. Specifically, when the irradiation time, the unit time, and the irradiation power per unit area of the irradiation object are constant during one-time irradiation of the laser beam, the number of laser beam irradiation times at second position 112, 122 in step S101 may be set larger than the number of laser beam irradiation times at first positions 111, 121 in step S102. Consequently, the total irradiation time of the laser beam per unit length of each of second positions 112, 122 in step S101 can be set larger than the total irradiation time of the laser beam per unit length of each of first positions 111, 121 in step S102, namely, the second irradiation energy can be set to a value higher than that of the first irradiation energy.

Figure 9:
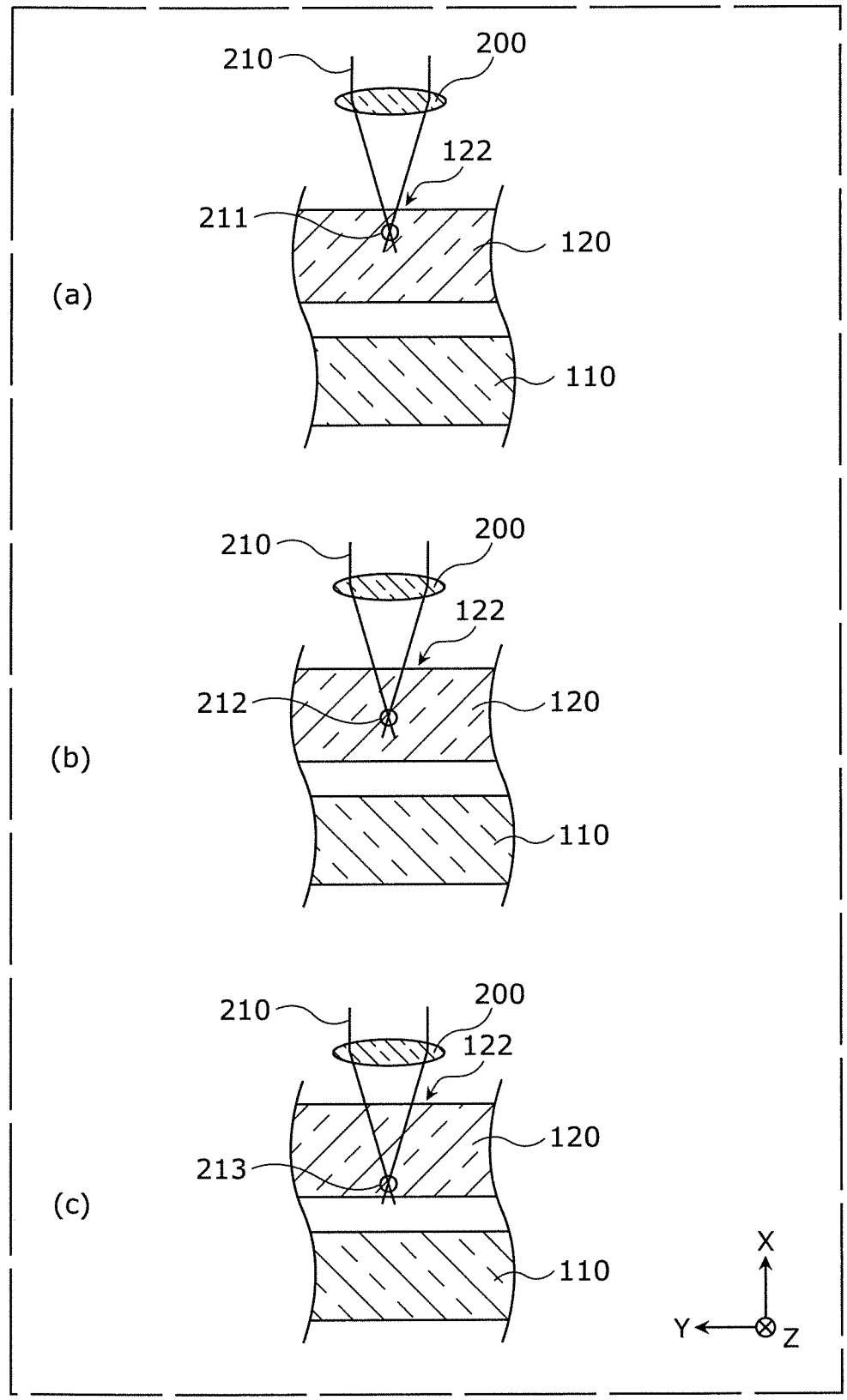
FIG. 9 is a partially enlarged sectional view illustrating an example of a process of irradiating second position of second glass plate with laser beam in the method for manufacturing liquid crystal display device according to the exemplary embodiment.
Figure 10:
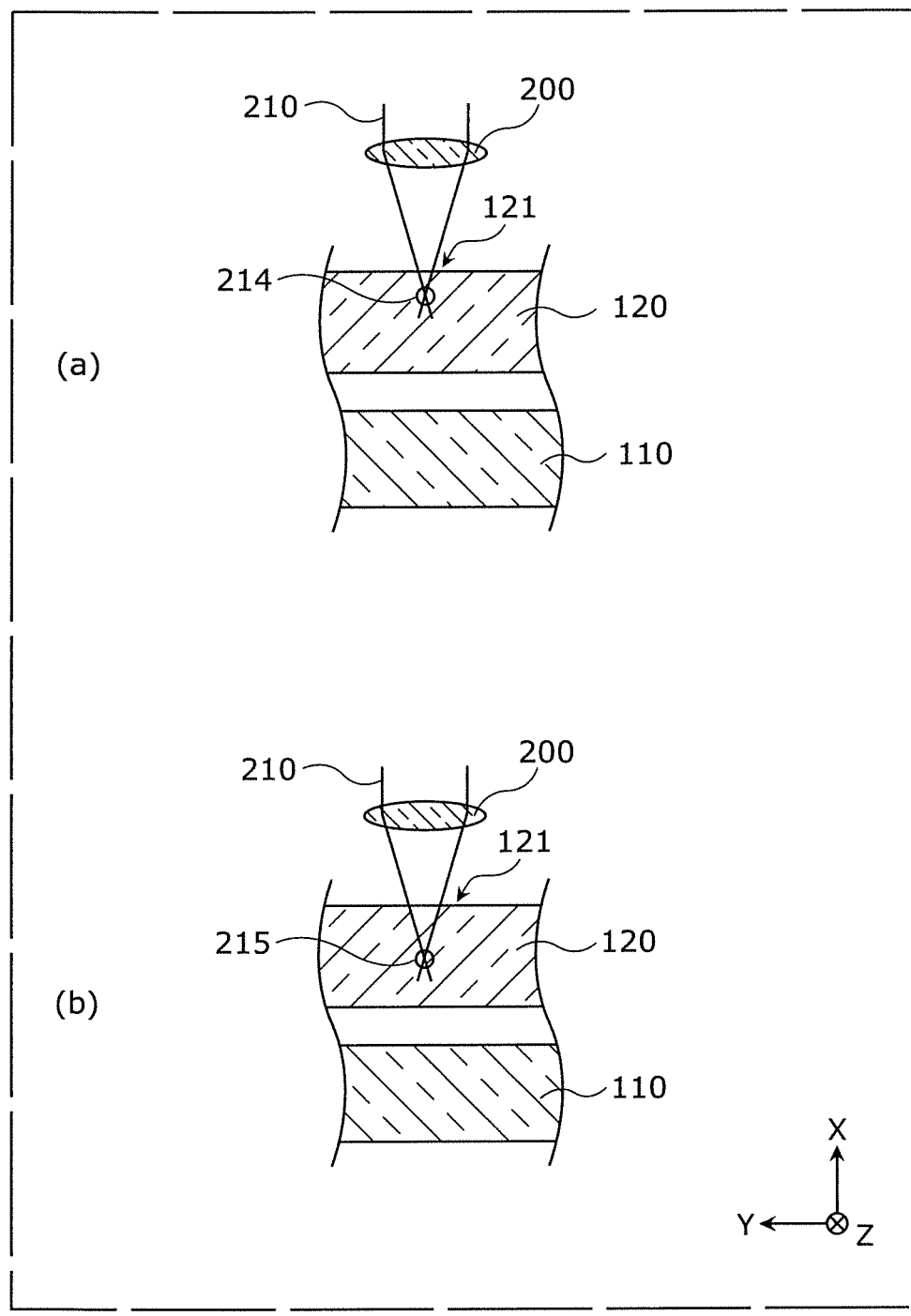
FIG. 10 is a partially enlarged sectional view illustrating an example of a process of irradiating first position of second glass plate with laser beam in the method for manufacturing liquid crystal display device according to the exemplary embodiment.

FIG. 9 is a partially enlarged sectional view illustrating an example of a process of irradiating second position 122 of second glass plate 120 with laser beam 210 in the method for manufacturing liquid crystal display device 1 of the exemplary embodiment. FIG. 10 is a partially enlarged sectional view illustrating an example of a process of irradiating first position 121 of second glass plate 120 with laser beam 210 in the method for manufacturing liquid crystal display device 1 of the exemplary embodiment. That is, FIG. 9 is a view illustrating an example of step S101 in FIG. 5, and FIG. 10 is a view illustrating an example of step S102 in FIG. 5.

In FIGS. 9 and 10, only first glass plate 110 and second glass plate 120 are illustrated for the sake of the description, and constituent elements of display panel 10 such as liquid crystal layer 13, TFT layer 11a, and CF layer 12a are partially omitted. Although the case that second glass plate 120 is irradiated with laser beam 210 is illustrated in FIGS. 9 and 10, the same is applied to the case that first glass plate 110 is irradiated with laser beam 210. During the one-time irradiation of laser beam 210, the irradiation times, the unit times, and the irradiation powers per unit area of the irradiation object illustrated in a part (a), a part (b), and a part (c) in FIG. 9 and a part (a) and a part (b) in FIG. 10 are constant, namely, the same.

As illustrated in the part (a) of FIG. 9, the position of lens 200 is adjusted such that a focal point of laser beam 210 is located at focal position 211. In the state illustrated in the part (a) of FIG. 9, second glass plate 120 is irradiated with laser beam 210 having a predetermined irradiation power for a predetermined irradiation time along second position 122 of second glass plate 120 in planar view.

As illustrated in the part (b) of FIG. 9, the position of lens 200 is adjusted such that the focal point of laser beam 210 is moved in the thickness direction so as to be located at focal position 212. In the state illustrated in the part (b) of FIG. 9, second glass plate 120 is irradiated with laser beam 210 having a predetermined irradiation power for a predetermined irradiation time along second position 122 of second glass plate 120 in planar view.

As illustrated in the part (c) of FIG. 9, the position of lens 200 is adjusted such that the focal point of laser beam 210 is moved in the thickness direction so as to be located at focal position 213. In the state illustrated in the part (c) of FIG. 9, second glass plate 120 is irradiated with laser beam 210 having a predetermined irradiation power for a predetermined irradiation time along second position 122 of second glass plate 120 in planar view.

As illustrated in the part (a) of FIG. 10, the position of lens 200 is adjusted such that the focal point of laser beam 210 is located at focal position 214. In the state illustrated in the part (a) of FIG. 10, second glass plate 120 is irradiated with laser beam 210 having a predetermined irradiation power for a predetermined irradiation time along first position 121 of second glass plate 120 in planar view.

As illustrated in the part (b) of FIG. 10, the position of lens 200 is adjusted such that the focal point of laser beam 210 is moved in the thickness direction so as to be located at focal position 215. In the state illustrated in the part (b) of FIG. 10, second glass plate 120 is irradiated with laser beam 210 having a predetermined irradiation power for a predetermined irradiation time along first position 121 of second glass plate 120 in planar view.

As described above, for example, laser beam 210 in steps S101 and S102 in FIG. 5 is focused using lens 200, and the position of the focal point of laser beam 210 focused using lens 200 in steps S101 and S102 varies in the thickness direction of first glass plate 110 and second glass plate 120 in each number of the irradiation times of laser beam 210.

In irradiating first glass plate 110 and second glass plate 120 with laser beam 210, the irradiation time and the irradiation power of laser beam 210 may be the same or different in each focal position.

With reference to FIG. 5, an etching step of etching first glass plate 110 and second glass plate 120 is performed after step S102 (step S103). Specifically, in step S103, as illustrated in the part (c) of FIG. 6, the part (c) of FIG. 7, and the part (c) of FIG. 8, the etching is performed after steps S101 and S102, whereby a whole thickness of first glass plate 110 and second glass plate 120 is reduced. In the modified layer, the etching speed is faster than that of the other portions except for the modified layer. Although second position 112 of first glass plate 110 and second position 122 of second glass plate 120 are cleaved, the etching is stopped before first position 111 of first glass plate 110 and first position 121 of second glass plate 120 are cleaved. Thus, display panel 10 (specifically, first glass plate 110 and second glass plate 120) is exposed in an etching solution such that at least a part of an outer periphery of first substrate 11 and second substrate 12 in FIGS. 3A and 3B is formed. The etching solution may arbitrarily be selected.

A cleaving step of cleaving first positions 111, 121 by mechanical external force is performed after step S103 (step S104). Specifically, in step S104, as illustrated in a part (d) of FIG. 6, a part (d) of FIG. 7, and a part (d) of FIG. 8, first position 111 of first glass plate 110 and first position 121 of second glass plate 120 are cleaved to form display panel 10 including first substrate 11 and second substrate 12, namely, notch 80 in FIG. 1.

As described above, in step S102, the modified layer is formed in the thickness direction in a part of each of first position 111 of first glass plate 110 and first position 121 of second glass plate 120, but the modified layer is not formed in the other parts except for the part. Consequently, first position 111 of first glass plate 110 and first position 121 of second glass plate 120 are not cleaved in step S102, but can easily be cleaved by the mechanical external force in step S104.

In the flowchart of FIG. 5, first positions 111, 121 and second positions 112, 122 are irradiated with laser beam 210 in different steps. Alternatively, before step S103, first positions 111, 121 may be irradiated with laser beam 210 having the first irradiation energy, and second positions 112, 122 may be irradiated with laser beam 210 having the second irradiation energy.

For example, both first positions 111, 121 and second positions 112, 122 may be irradiated with laser beam 210 with the first irradiation energy, and only second positions 112, 122 in first positions 111, 121 and second positions 112, 122 may be irradiated with laser beam 210 having irradiation energy that is a difference between the second irradiation energy and the first irradiation energy. Consequently, first positions 111, 121 may be irradiated with laser beam 210 having the first irradiation energy, and second positions 112, 122 may be irradiated with laser beam 210 having the second irradiation energy.

For example, the order of steps S101 and S102 in FIG. 5 may be reversed.

As described above, the irradiation time of laser beam 210 per unit length with respect to second positions 112, 122 is longer than the irradiation time of laser beam 210 per unit length with respect to first positions 111, 121 while the irradiation power of laser beam 210 is kept constant. However, the present disclosure is not limited to the exemplary embodiment. For example, the irradiation power of laser beam 210 with respect to second positions 112, 122 may be more increased than the irradiation power of laser beam 210 with respect to first positions 111, 121 while the irradiation time of laser beam 210 with respect to first positions 111, 121 and second positions 112, 122 is kept constant.

In the part (b) of FIG. 7, in first position 121 of second glass plate 120, the portion not overlapping first position 111 of first glass plate 110 and the portion overlapping first position 111 of first glass plate 110 are irradiated with laser beam 210 at one time. However, the present disclosure is not limited to the exemplary embodiment.

Figure 11:
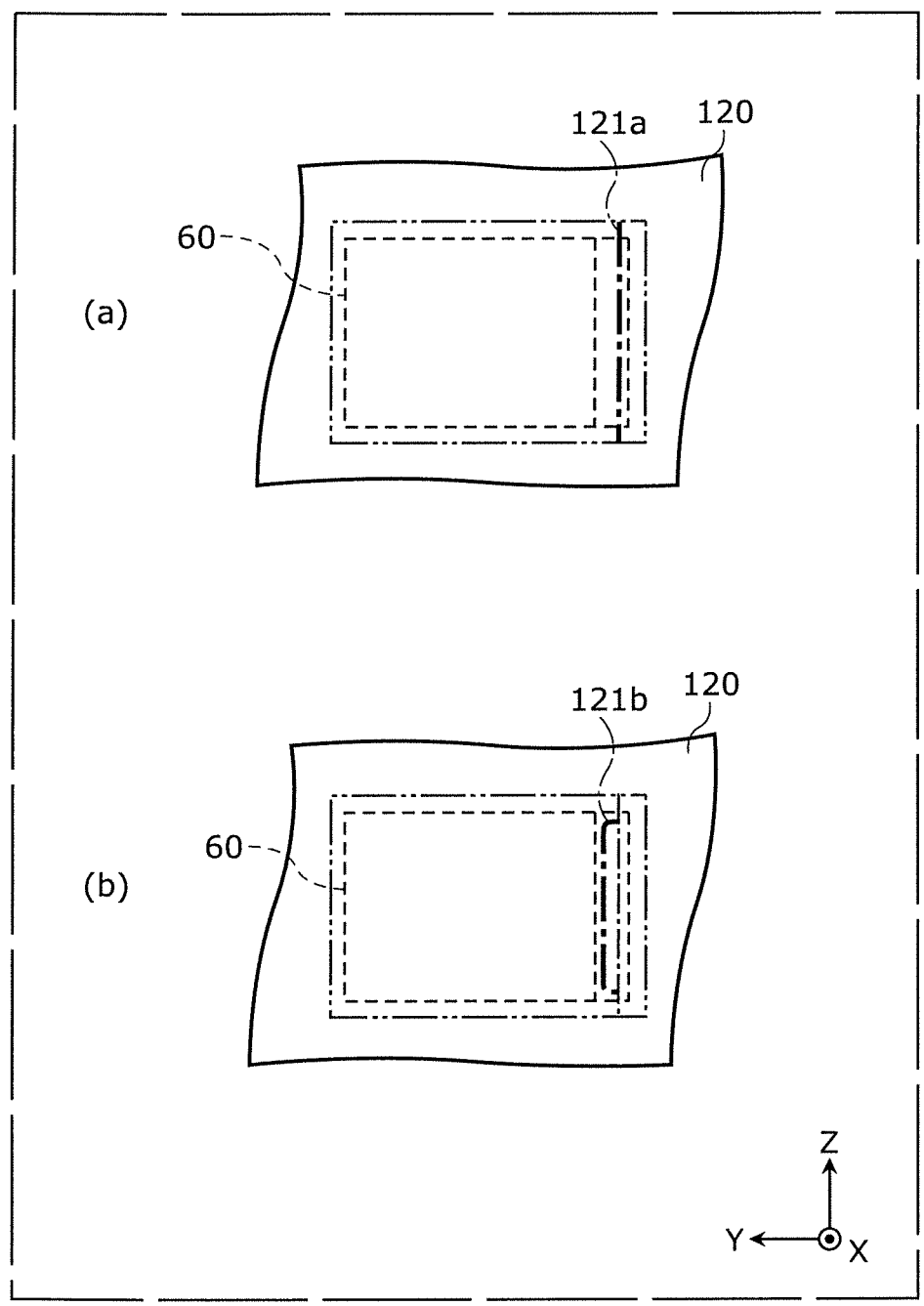
FIG. 11 is a plan view illustrating another example of the process of manufacturing second substrate included in liquid crystal display device according to the exemplary embodiment.

FIG. 11 is a plan view illustrating another example of the process of manufacturing second substrate 12 included in liquid crystal display device 1 of the exemplary embodiment. Specifically, FIG. 10 is another example of the step illustrated in the part (b) of FIG. 7.

As illustrated in a part (a) of FIG. 11, first position 121a of second glass plate 120 is irradiated with laser beam 210 having the first irradiation energy. First position 121a of second glass plate 120 is a portion overlapping first position 111 of first glass plate 110 in planar view. In FIG. 11, first positions 121a, 121b are indicated by alternate long and short dash lines.

As illustrated in a part (b) of FIG. 11, first position 121b of second glass plate 120 is irradiated with laser beam 210 having the first irradiation energy. First position 121b of second glass plate 120 is a portion that does not overlap first position 111 of first glass plate 110 in planar view.

As described above, in the step of irradiating first position 121 of second glass plate 120 with laser beam 210 having the first irradiation energy, the portion overlapping first position 111 of first glass plate 110 in planar view may be irradiated with laser beam 210 and the portion that does not overlap first position 111 of first glass plate 110 in planar view may be irradiated with laser beam 210.

The order of the step illustrated in the part (a) of FIG. 11 and the step illustrated in the part (b) of FIG. 11 may be reversed.

Second Example

Another method for manufacturing liquid crystal display device 1 of the exemplary embodiment will be described below with reference to FIGS. 6, 7, and 12.

Figure 12:
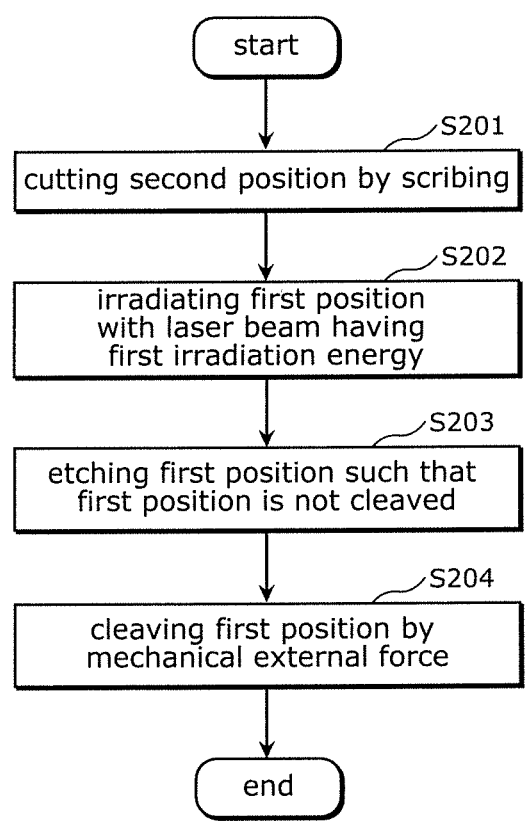
FIG. 12 is a flowchart illustrating the method for manufacturing liquid crystal display device according to the exemplary embodiment.

FIG. 12 is a flowchart illustrating the method for manufacturing liquid crystal display device 1 of the exemplary embodiment.

A cutting step of cutting second position 112 of first glass plate 110 illustrated in the part (a) of FIG. 6 and the part (a) of FIG. 8 and second position 122 of second glass plate 120 illustrated in the part (a) of FIG. 7 and the part (a) of FIG. 8 by scribing is performed (step S201). The expression "cutting by scribing" means that, for example, first glass plate 110 and second glass plate 120 are cut by a scribing device provided with a diamond cutter. That is, in the second example, unlike the first example, second positions 112, 122 are cut by not the irradiation of laser beam 210 or the etching, but the scribing.

A first irradiation step of irradiating first position 111 of first glass plate 110 illustrated in the part (b) of FIG. 6 and the part (b) of FIG. 8 and first position 121 of second glass plate 120 illustrated in the part (b) of FIG. 7 and the part (b) of FIG. 8 with laser beam 210 having the first irradiation energy is performed (step S202). That is, the process similar to step S102 in FIG. 5 is performed in step S202.

An etching step of etching first glass plate 110 and second glass plate 120 is performed (step S203). Specifically, in step S203, display panel 10 (specifically, first glass plate 110 and second glass plate 120) is exposed to an etching solution such that first position 111 of first glass plate 110 and first position 121 of second glass plate 120 are not cleaved. In step S203, the process similar to step S103 in FIG. 5 is performed. However, in the etching, because second positions 112, 122 are cut in step S201, the etching solution, etching time, and the like may be selected such that first positions 111, 121 are not cleaved.

A cleaving step of cleaving first positions 111, 121 by the mechanical external force is performed (step S204). That is, the process similar to step S104 in FIG. 5 is performed in step S204.

SUMMARY

As described above, the method for manufacturing liquid crystal display device 1 of the exemplary embodiment is the method for manufacturing liquid crystal display device 1 including display panel 10 provided with first substrate 11, second substrate 12 disposed opposite to first substrate 11, and the liquid crystal sandwiched between first substrate 11 and second substrate 12. The method for manufacturing liquid crystal display device 1 of the exemplary embodiment includes the first irradiation step of irradiating first positions 111, 121 of first glass plate 110 and second glass plate 120 with laser beam 210 having the first irradiation energy, the second irradiation step of irradiating second positions 112, 122 of first glass plate 110 and second glass plate 120 with laser beam 210 having the second irradiation energy higher than the first irradiation energy, and the etching step of exposing display panel 10 in the etching solution after the first irradiation step and the second irradiation step, such that first positions 111, 121 are not cleaved, second positions 112, 122 are cleaved, and at least a part of the outer periphery of first substrate 11 and second substrate 12 is formed.

Alternatively, another method for manufacturing liquid crystal display device 1 of the exemplary embodiment includes the cutting step of cutting first glass plate 110 and second glass plate 120 by the scribing, the first irradiation step of irradiating first position 111, 121 of first glass plate 110 and second glass plate 120 with laser beam 210, and the etching step of exposing first glass plate 110 and second glass plate 120 in the etching solution and etching at least a part of the outer periphery of first substrate 11 and second substrate 12 such that first position 111, 121 are not cleaved after the cutting step and the first irradiation step.

In these methods, second positions 112, 122 corresponding to the outer peripheries of first substrate 11 and second substrate 12 cut in the second irradiation step and the cutting step can be smoothened by etching in the etching step. In the etching step, first positions 111, 121 are adjusted so as not to be cleaved, which allows the etching solution to be suppressed from being exposed to the wiring (for example, electrode layer 14) on the surface on the side where TFT layer 11a of first substrate 11 of non-overlapping portion 71 is formed. For this reason, in these methods, the generation of the component failure due to the etching can be suppressed.

For example, the method for manufacturing liquid crystal display device 1 of the exemplary embodiment further includes the cleaving step of cleaving first positions 111, 121 by the mechanical external force after the etching step.

In this method, notch 80 is formed after the etching step. For this reason, in the method, the generation of the component failure such as the wiring disposed in first substrate 11 of non-overlapping portion 71 due to the etching can further be suppressed.

For example, in the method for manufacturing liquid crystal display device 1 of the exemplary embodiment, first positions 111, 121 and second positions 112, 122 are set such that a part of first position 111 of first glass plate 110 overlaps first position 121 of second glass plate 120 in planar view, such that the other portions of first position 111 of first glass plate 110 does not overlap first position 121 of second glass plate 120 in planar view, and such that whole second position 112 of first glass plate 110 overlaps second position 122 of second glass plate 120 in planar view.

In this method, second position 112 of first glass plate 110 and second position 122 of second glass plate 120 overlap each other in planar view, and the sides of second substrate 12 and the sides of first substrate 11 can be cut together except for the side in which notch 80 is formed, so that the outer shapes of first substrate 11 and second substrate 12 except for notch 80 are easily made uniform. A part of first position 111 of first glass plate 110 overlaps first position 121 of second glass plate 120 in planar view, and the other portions of first position 111 of first glass plate 110 does not overlap first position 121 of second glass plate 120 in planar view, so that notch 80 can be formed in order to provide non-overlapping portion 71.

For example, in the method for manufacturing liquid crystal display device 1 of the exemplary embodiment, first positions 111, 121 fall within the range of the region surrounded by second positions 112, 122.

Thus, by providing first positions 111, 121 within the range of the region surrounded by second positions 112, 122, notches 80 can be formed to provide non-overlapping portions 71.

For example, in the method for manufacturing liquid crystal display device 1 of the exemplary embodiment, the irradiation time of laser beam 210 per unit length at second positions 112, 122 in the second irradiation step is longer than the irradiation time of laser beam 210 per unit length at first positions 111, 121 in the first irradiation step.

In the method, for example, even if the irradiation power of laser beam 210 is kept constant, the second irradiation energy can be more increased than the first irradiation energy.

For example, in the method for manufacturing liquid crystal display device 1 of the exemplary embodiment, the number of irradiation times of laser beam 210 at second positions 112, 122 in the second irradiation step is larger than the number of irradiation times of laser beam 210 at first positions 111, 121 in the first irradiation step.

For example, even if the irradiation power of laser beam 210 is kept constant, the second irradiation energy can be more increased than the first irradiation energy even by this method.

For example, in the method for manufacturing liquid crystal display device 1 of the exemplary embodiment, as illustrated in FIGS. 8 and 9, laser beam 210 in the first irradiation step and the second irradiation step is focused using lens 200, and the positions of the focal points of laser beam 210 focused using lens 200 in the first irradiation step and the second irradiation steps vary in the thickness direction of first glass plate 110 and second glass plate 120 in each number of the irradiation times of laser beam 210.

By this method, unevenness of the irradiation energy can be suppressed in the thickness direction in which first positions 111, 121 and second positions 112, 122 are irradiated with laser beam 210. Consequently, a manufacturing variation such as the cleavage or non-cleavage by the etching can be suppressed at first positions 111, 121 and second positions 112, 122.

Liquid crystal display device 1 of the exemplary embodiment includes display panel 10 provided with first substrate 11, second substrate 12 disposed opposite to first substrate 11, and liquid crystal layer 13 sandwiched between first substrate 11 and second substrate 12, and seal member 60 formed between first substrate 11 and second substrate 12 to bond both first substrate 11 and second substrate 12. When display panel 10 is viewed in planar view, seal member 60 includes first seal part 61 annularly surrounding liquid crystal layer 13 and second seal part 62 in which end 62a is connected to first seal part 61 while end 62b overlaps first substrate 11 and second substrate 12 in planar view.

With this configuration, first substrate 11 and second substrate 12 are bonded together by not only first seal part 61 but also second seal part 62, so that the generation of the failure such as peeling-off of first substrate 11 and second substrate 12 can be suppressed.

For example, when display panel 10 is viewed in planar view, second substrate 12 includes notch 80 in which one side where end 62b of second seal part 62 overlaps in planar view is cut out.

With this configuration, because notch 80 is formed, second seal part 62 is located in the vicinity of non-overlapping portion 71 where first substrate 11 and second substrate 12 are easily peeled off due to application of the external force. Consequently, the generation of the failure such as peeling-off of first substrate 11 and second substrate 12 can be suppressed even if notch 80 is formed.

For example, first substrate 11 has the substantially rectangular shape in planar view, and the contour of notch 80 of second substrate 12 has the radius of curvature larger than those of four corners 90 of first substrate 11 in planar view.

Consequently, a crack is hardly generated in notch 80.

For example, liquid crystal display device 1 of the exemplary embodiment further includes external substrate 50 that receives the external video signal and flexible substrate 40 connecting external substrate 50 and first substrate 11, and first substrate 11 is connected to flexible substrate 40 at non-overlapping portion 71 that does not overlap second substrate 12 in planar view.

Thus, non-overlapping portion 71 is formed by providing notch 80 in second substrate 12 of display panel 10. In display panel 10 including non-overlapping portion 71, first substrate 11 and external substrate 50 are easily electrically connected to each other through flexible substrate 40. That is, with this configuration, first substrate 11 and external substrate 50 can electrically be connected to each other through flexible substrate 40 while the generation of the failure such as the peeling-off of first substrate 11 and second substrate 12 is suppressed.

ANOTHER EXEMPLARY EMBODIMENT

The method for manufacturing the liquid crystal display device and the liquid crystal display device of the present disclosure have been described above based on the exemplary embodiment, but the present disclosure is not limited to the exemplary embodiment.

For example, in the above exemplary embodiment, display panel 10 is described as the flat plate shape in which first substrate 11 and second substrate 12 overlap each other. However, the display panel may be curved.

Figure 13A:
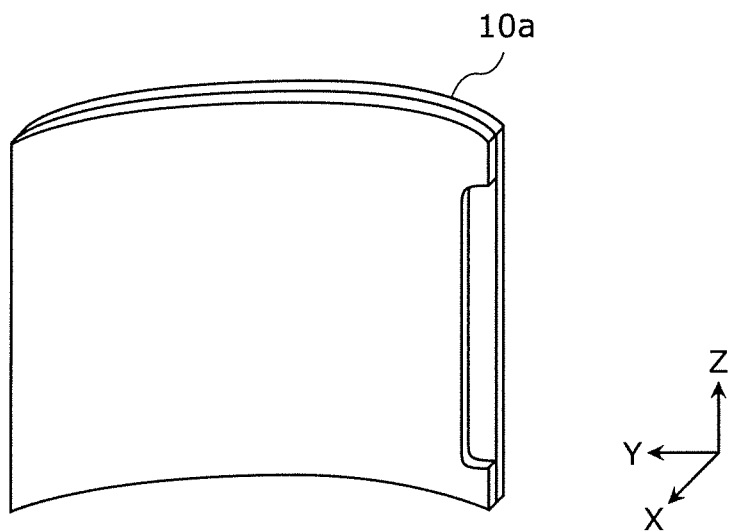
FIG. 13A is a view schematically illustrating display panel of a liquid crystal display device according to another exemplary embodiment.
Figure 13B:
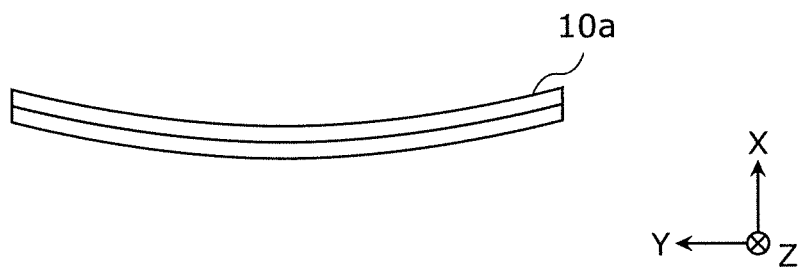
FIG. 13B is a side view illustrating display panel of the liquid crystal display device according to another exemplary embodiment.

FIG. 13A is a view schematically illustrating display panel 10a of a liquid crystal display device according to another exemplary embodiment. FIG. 13B is a side view illustrating display panel 10a of the liquid crystal display device of another exemplary embodiment.

Unlike display panel 10, display panel 10a does not have the flat plate shape. Display panel 10a has a substantially rectangular shape in planar view, and a short side is not curved while a long side is curved in side view.

With this configuration, the liquid crystal display device of another exemplary embodiment including display panel 10a can be used as a curved surface monitor in which the image display surface is curved. For example, when the liquid crystal display device of another exemplary embodiment is used as a monitor, such as a personal computer, which a user views in close proximity, the end of the image display surface is close to the eyes of the user as compared with the flat image display surface. For this reason, for example, even if the image display region is enlarged by increasing the size of the liquid crystal display device of another exemplary embodiment, the user can easily view the whole image display region.

An embodiment obtained by making various modifications of the exemplary embodiment by to those skilled in the art and an embodiment implemented by arbitrarily combining the constituent elements and functions in the exemplary embodiment without departing from the scope of the present disclosure are also included in the present disclosure.

What is claimed is:

1. A method for manufacturing a liquid crystal display device including a display panel provided with a first substrate, a second substrate disposed opposite to the first substrate, and liquid crystal sandwiched between the first substrate and the second substrate, the method comprising:
   a first irradiation step of irradiating first positions of a first glass plate and a second glass plate with a laser beam having first irradiation energy;
   a second irradiation step of irradiating second positions of the first glass plate and the second glass plate with the laser beam having second irradiation energy higher than the first irradiation energy; and
   an etching step of exposing the display panel to an etching solution after the first irradiation step and the second irradiation step, such that the first positions are not cleaved, the second positions are cleaved, and at least a part of an outer periphery of each of the first substrate and the second substrate is formed.

2. The method according to claim 1, further comprising a cleaving step of cleaving the first position by mechanical external force after the etching step.

3. The method according to claim 1, wherein a part of the first position of the first glass plate overlaps the first position of the second glass plate in planar view,
   the other portion of the first position of the first glass plate does not overlap the first position of the second glass plate in planar view, and
   the whole second position of the first glass plate overlap the second position of the second glass plate in planar view.

4. The method according to claim 3, wherein the first position falls within a range of a region surrounded by the second position.

5. The method according to claim 3, wherein an irradiation time of the laser beam per unit length at the second position in the second irradiation step is longer than an irradiation time of the laser beam per unit length at the first position in the first irradiation step.

6. The method according to claim 3, wherein a number of irradiation times of the laser beam at the second position in the second irradiation step is greater than a number of irradiation times of the laser beam at the first position in the first irradiation step.

7. The method according to claim 1, wherein the first position falls within a range of a region surrounded by the second position.

8. The method according to claim 1, wherein an irradiation time of the laser beam per unit length at the second position in the second irradiation step is longer than an irradiation time of the laser beam per unit length at the first position in the first irradiation step.

9. The method according to claim 1, wherein a number of irradiation times of the laser beam at the second position in the second irradiation step is greater than a number of irradiation times of the laser beam at the first position in the first irradiation step.

10. The method according to claim 9 wherein the laser beam in the first irradiation step and the second irradiation step is focused using a lens, and
   a position of a focal point of the laser beam focused using the lens in the first irradiation step and the second irradiation step varies in a thickness direction of the first glass plate and the second glass plate in each number of the irradiation times of the laser beam.

* * * * *